United States Patent
Altmejd et al.

(10) Patent No.: US 6,795,927 B1
(45) Date of Patent: Sep. 21, 2004

(54) POWER STATE RESYNCHRONIZATION

(75) Inventors: Morrie Altmejd, Austin, TX (US);
Richard Russell, Austin, TX (US);
Evandro Menezes, Austin, TX (US);
David F. Tobias, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 632 days.

(21) Appl. No.: 09/907,083

(22) Filed: Jul. 17, 2001

Related U.S. Application Data

(60) Provisional application No. 60/287,897, filed on May 1, 2001.

(51) Int. Cl.[7] ................................................ G06F 1/26
(52) U.S. Cl. ........................ 713/300; 713/310; 713/320
(58) Field of Search ................................. 713/300, 310, 713/320, 324, 340, 323, 330, 322

(56) References Cited

U.S. PATENT DOCUMENTS

| | | | |
|---|---|---|---|
| 5,692,204 A | * 11/1997 | Rawson et al. | 713/340 |
| 5,745,375 A | 4/1998 | Reinhardt et al. | 364/492 |
| 5,812,860 A | 9/1998 | Horden et al. | 395/750.04 |
| 5,852,737 A | 12/1998 | Bikowsky | 395/750.05 |
| 5,873,000 A | 2/1999 | Lin et al. | 395/892 |
| 5,881,298 A | 3/1999 | Cathey | 395/750.06 |
| 5,884,049 A | 3/1999 | Atkinson | 395/281 |
| 5,887,179 A | 3/1999 | Halahmi et al. | 395/750.06 |
| 5,925,133 A | 7/1999 | Buxton et al. | 713/323 |
| 6,014,611 A | 1/2000 | Arai et al. | 702/132 |
| 6,092,209 A | * 7/2000 | Holzhammer et al. | 713/324 |
| 6,446,214 B2 | * 9/2002 | Chrysanthakopoulos | 713/310 |
| 6,665,802 B1 | * 12/2003 | Ober | 713/320 |
| 6,704,877 B2 | * 3/2004 | Cline et al. | 713/320 |

FOREIGN PATENT DOCUMENTS

| | | | |
|---|---|---|---|
| EP | 0632360 A1 | 1/1995 | |
| EP | 727728 A1 | * 8/1996 | G06F/1/32 |
| JP | 08328698 | 12/1996 | |

OTHER PUBLICATIONS

Lu et al, Software Controlled Power Management, 1999 IEEE, pp. 157–161.*

IBM Technical Disclosure Bulletin "Power Management Clock Change for 603 Processor", vol. 38, No. 12, Dec. 1995, pp. 325–327.

* cited by examiner

*Primary Examiner*—Dennis M. Butler
*Assistant Examiner*—Suresh K Suryawanshi
(74) *Attorney, Agent, or Firm*—Zagorin, O'Brien & Graham, LLP

(57) ABSTRACT

A computer system has multiple performance states. The computer system periodically determines if the software power state maintained by power management software that represents the power state of the processor or other computer system component matches the actual power state of the processor or other computer system component. If not, the actual power state and the software power state are resynchronized, for example, by reinitializing the power management software or otherwise causing the software power state to match the hardware power state.

19 Claims, 6 Drawing Sheets

POWER STATE RESYNCHRONIZATION

RELATED APPLICATION(S)

This application claims the benefit under 35 U.S.C. § 119(e), of provisional application No. 60/287,897, filed May 1, 2001, which is incorporated herein by reference in its entirety.

BACKGROUND OF THE INVENTION

1. Field of the Invention

This invention relates to computer systems and more particularly to power management of such systems.

2. Description of the Related Art

Power consumption and associated performance and thermal issues are considerations for every computer system design. For example, a conventional notebook computer (also commonly referred to as laptop or portable computer) has power and thermal constraints that cause it to operate at performance states below an equivalent desktop computer.

Many power saving techniques have been introduced to try and mitigate the impact of thermal and battery power constraints. The frequency of operation (clock frequency) of the processor and its operating voltage determines its power consumption. Since power consumption and therefore heat generation are roughly proportional to the processor's frequency of operation, scaling down the processor's frequency has been a common method of staying within appropriate power limitations. Microprocessors utilized in mobile applications, i.e., those used in battery powered systems, are particularly sensitive to power considerations and therefore generally require the lowest supply voltage that can achieve the rated clock speed. That is in part due to the small, densely packed system construction that limits the ability of the mobile computer system to safely dissipate the heat generated by computer operation.

A common power management technique called "throttling" prevents the processor from over heating by temporarily placing the processor in a stop grant state. During the stop grant state the processor does not execute operating system or application code and typically has its clocks gated off internally to reduce power consumption. Throttling is an industry standard method of reducing the effective frequency of processor operation and correspondingly reducing processor power consumption by using a clock control signal (e.g. the processor's STPCLK# input) to modulate the duty cycle of processor operation. A temperature sensor monitors the processor temperature to determine when throttling is needed. Throttling continuously stops and starts processor operation and reduces the effective speed of the processor resulting in reduced power dissipation and thus lowering processor temperature.

Referring to FIG. 1, one prior art system capable of implementing throttling is illustrated. Processor (CPU) 101 receives voltage 102 from voltage regulator 103. The voltage regulator is controlled by voltage identification (VID) signals 104 which are set by system jumper settings 105. A clock multiplier value 107, supplied from system jumper settings 105 (bus frequency (BF)[2:0]) is supplied to CPU 101. CPU 101 multiplies a received bus clock 109 by the multiplier value 107 to generate the core clocks for the processor.

CPU 101 receives a STPCLK# (the # sign indicates the signal is active low) input, which is used to temporarily suspend core clock operation and conserve power. An asserted STPCLK# signal results in the processor entering a stop grant state. In that state, execution of operating system (OS) and application code is stopped, and the core clocks are typically stopped although some minimum logic including clock multiplier logic may still operate.

Appropriately monitoring and controlling the processor's operating parameters is important to optimizing the notebook's performance and battery life. Power management in older personal computer systems was typically implemented using micro-controllers and/or proprietary use of the system management interrupt (SMI). Current x86 based computer systems utilize an industry supported power management approach described in the Advanced Configuration and Power Interface Specification (ACPI). The ACPI is an operating system (OS) controlled power management scheme that uses features built into the Windows 9x and Windows NT or other compatible operating systems. It defines a standard interrupt (System Control Interrupt or SCI) that handles all ACPI events. Devices generate system control interrupts to inform the OS about system events.

As part of that power management approach, ACPI specifies sleep and suspend states. Sleep states temporarily halt processor operation and operation can be restored in a few milliseconds. A processor enters the sleep state when internal activity monitors indicate no processing is taking place. When a keystroke is entered, a mouse moves or data is received via a modem, the processor wakes up.

Suspend states shut down more of the subsystems (e.g. display or hard drive) and can take a few seconds for operation to be restored. Suspend states may copy the present context of the system (sufficient for the computer to resume processing the application(s) presently opened) into memory (suspend to RAM) or to the hard drive (suspend to disk) and power down peripherals.

For example, in a word processing application, a processor will do a brief burst of work after each letter is typed, then its operation is stopped until the next keystroke. Additionally, peripheral devices may be turned off to obtain move power savings. For example, the processor's hard drive may be suspended after a certain period of inactivity until it is needed again. If the system detects another period of inactivity, e.g., a few minutes, the display may be turned off. Such techniques are useful in conserving battery power and in the case of the processor, reducing the amount of heat needed to be dissipated. It is also common practice to use a cooling fan to increase the amount of heat removed from the system, lower processor temperature and prevent damage to the system.

While the ACPI environment provides a number of mechanisms to deal with thermal and power issues, it fails to provide a sophisticated power management capability that can more effectively reduce power consumption in computer systems. While power consumption issues are particular important for small portable computers, power consumption issues are important for desktop computers as well. For example, while batteries may not be a consideration for desktop computers, thermal considerations are still an important criteria. In particular, for desktop computers, the hotter they run, the more likely fans are turned on to try and cool the processor, which results in fan noise or frequent cycling of the fans that may be objectionable to the computer user. In addition, saving power can have real economic benefits.

Further, traditional throttling techniques have limitations for certain types of applications. More particularly, throttling has a time overhead associated with it that may disallow its use for some real time (e.g., a soft modem) applications.

Thus, although throttling can achieve an "effective frequency", an effective frequency is not always as useful as an actual frequency. For example, assume legacy power management techniques are throttling a 1 GHz CPU down to an "effective speed" of 300 MHz. The latency (actual stopped time and switching time) involved in throttling can cause a CPU having an "effective speed" of 300 MHz, to be unable to satisfactorily support a real time application, while a processor actually running at 300 MHz could properly support the application. Thus, there is a difference between actual and effective frequencies for certain applications.

In view of the above considerations, it would be desirable to save power, both in desktop systems and portable systems, without affecting the performance states perceived by the user. In order to do that it would be desirable for power management techniques to determine what performance states were required, and adapt power levels to meet the performance requirements. Those and other improvements in power management are desirable to more effectively provide high performance and effective power management.

SUMMARY OF THE INVENTION

In order to ensure that power management software and the actual performance state of a computer system having multiple performance states, remain synchronized, the computer system periodically determines if the power state maintained by power management software matches the actual power state of the processor or other component of the computer system. If not, the actual power state and the software power state are resynchronized, for example, by reinitializing the power management software or otherwise causing the software state to match the hardware state.

In one embodiment, the invention provides a method of managing power in a computing system that includes periodically determining a current hardware power state of an integrated circuit and periodically comparing the current hardware state to a software state maintained by power management software representing the assumed power state of the integrated circuit. If a discrepancy is found to exist between the hardware state and the software state the hardware and software state are resynchronized. The resynchronization may be accomplished in several ways. For example, the resynchronizing may include reinitializing the power management software maintaining the software state. Alternatively, the resynchronization may be accomplished by changing the current software state to match the hardware state or changing the hardware state to match the software state.

In another embodiment, a computer system includes a processor. A first instruction sequence that is operable on the processor periodically determines a current hardware power state of the processor. A second instruction sequence that executes on the processor, periodically compares the current hardware power state to a software maintained power state, the software maintained power state indicating a power state assumed by power management software. The second instruction sequence also provides an indication of the results of the comparison. A third instruction sequence operable on the processor resynchronizes the hardware power state and the software maintained power state if a discrepancy exists between the hardware power state and the software maintained power state.

In another embodiment a computer program product is provided to periodically determine an actual performance state of an integrated circuit and to periodically compare the actual performance state to a software maintained performance state and generate an indication of the comparison. If the indication shows a discrepancy exists between the actual performance state and the software maintained performance state, the computer program product resynchronizes the actual performance state and the software maintained performance state.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
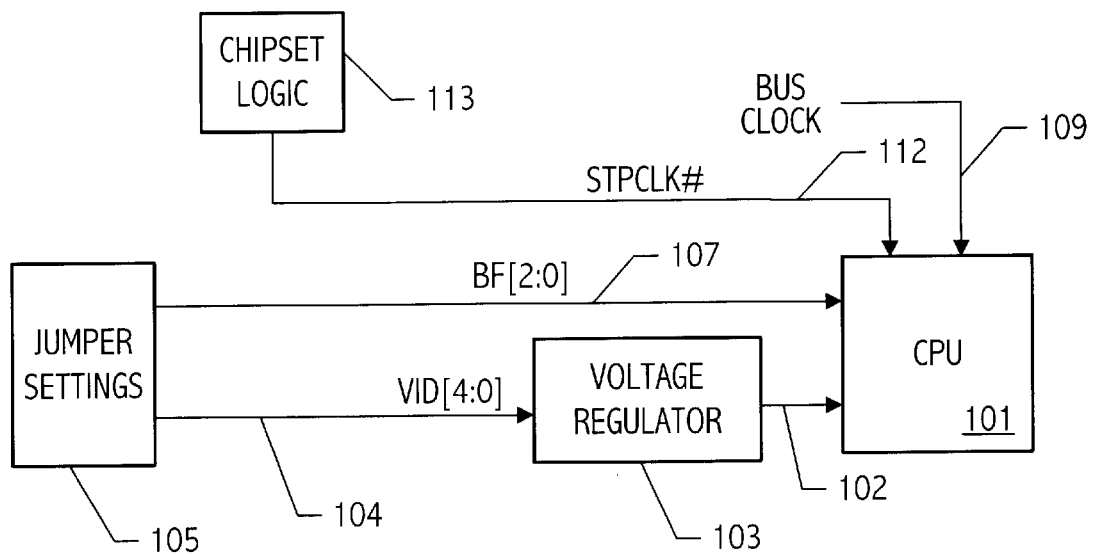
FIG. 1 shows a prior art computer system capable of using throttling to effectuate power savings.
Figure 2:
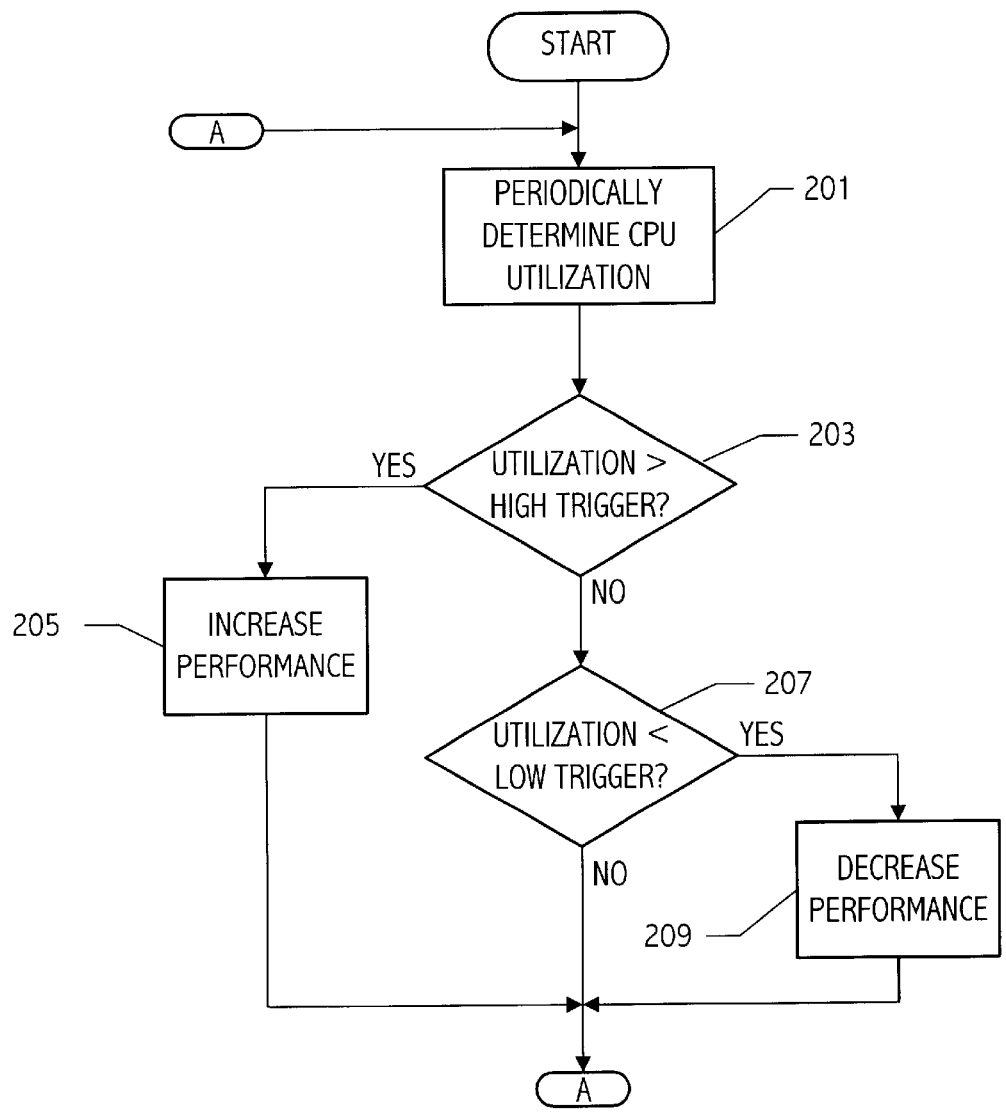
FIG. 2 is a high level flow diagram of power management operation according to an embodiment of the invention.

A computer system according to one embodiment of the invention has a plurality of processor performance states, generally based on unique voltage/frequency pairs. A power management control function in the computer system periodically determines the utilization level of the processor, i.e., how much of the available processor resources are being utilized, and selects a next performance state that is appropriate for the utilization level. Referring to FIG. 2, a flow diagram illustrates at a high level, operation of power management function utilized to provide the requisite power management control. The current utilization is periodically determined in 201. That current utilization is then compared to a high threshold level, e.g., 80% in 203. If the utilization level is above the high threshold level, indicating that processor resources are being utilized at a level above 80%, the power management control function increases the performance state of the processor in 205. In one embodiment, that can be accomplished by selecting a voltage/frequency pair that provides greater performance and then causing the processor to operate at the new voltage and frequency, as described further herein.

If the current utilization is below the high threshold, then the current utilization is compared to the low threshold in 207. An exemplary low threshold level is 55%. If the current utilization is below that low threshold, the power management control function decreases the performance state of the processor in 209. As described further herein, that may be accomplished by selecting, e.g., a voltage/frequency pair providing lower performance and then causing the performance change to occur. The power management control function then returns to 201 to periodically determine the utilization level and again compare the current utilization level to the high and low threshold levels. In that way the power management can tailor the performance state of the processor to the actual requirements.

In a computer system with several possible processing performance states, if the management control function determines that more performance is necessary to meet performance requirements, one approach to providing increased performance is to increase the performance one step at a time until the current utilization is below the high threshold level. However, in a preferred embodiment, rather than increasing the performance state one step at a time, the power management control function selects the highest performance state regardless of the current performance state. The reasons for always selecting the highest possible performance state when a higher performance state is needed are as follows. In computer systems, performance demands are often of a bursty nature. When a higher performance state is required based on the current utilization level, stepping the performance state to a next higher level can result in degradation of performance that can be perceived by the user. That is especially true when the task that needs the increased performance requires a near real-time response, for instance, while decoding an audio or video file.

Figure 3:
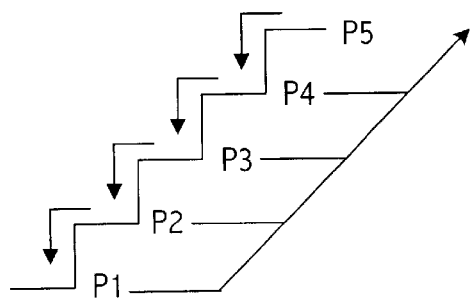
FIG. 3 illustrates switching between performance states according to the power management approach described herein.

FIG. 3 illustrates that concept. Assume the processor has five performance states P1–P5, with P5 being the highest and P1 the lowest. Whenever the power management determines that a higher performance state is required when operating at any of the levels P1–P4, the power management selects the maximum performance state P5 as the next performance state. Thus, if the performance state is always taken straight to the maximum performance state when a performance increase is required, there is less of a chance that a user could notice any performance degradation. In effect, the power management control function anticipates a peak loading by assuming that any indication of a required increase in performance is assumed to be a burst requiring peak performance.

However, if a lower performance state is required, a next lower performance state is selected. Thus, if at performance state P5, P4 is selected as the next lower performance state. If the current performance state is P4, the next lower performance state selected is P3 when a performance decrease is effectuated by the power management control function. In that way, if the performance is still too high, successively lower performance states can be selected and the chance than any degradation is detected by a system user is reduced. Thus, in a preferred embodiment, if the utilization information indicates that increase in performance is necessary, the power management control function selects the maximum, while a decrease in performance causes the power management control function to step to the next lowest performance state.

In another embodiment, the selected lower performance state may be selected proportionally to the CPU utilization . For example, if CPU utilization is <20% then the initial lower performance state may be two steps below the current performance state rather than just one. Assume that each step approximately halves the performance. Then if CPU utilization is <20%, a two step drop would bring the utilization to between the upper and lower thresholds (55%–80%). Alternatively, as described above, the two step drop could be accomplished one step at a time.

Note that in another embodiment, the target performance state when a performance increase is needed may be other than the maximum performance state. For example a performance state close to the maximum performance state may be sufficient to prevent noticeable performance degradation and thus, that slightly lower than maximum performance state can be selected as the target for all performance state increases. The availability of implementing such an embodiment depends on a variety on factors including the granularity of the performance levels provided by the system and whether the near maximum performance state sufficiently minimizes performance degradation problems.

If the processor utilization is kept within the range of the high and low thresholds, then a user should experience a crisp, high performance system, while still getting the benefit of power savings for those applications or those portions of applications requiring less performance. That approach reduces power consumption, extends battery life, reduces temperature resulting in less need for cooling and thus less fan noise, while still maintaining high performance and thus maintaining a perception of fast response to the user. Note that running at a lower average CPU die temperature increases CPU reliability, and that a lower CPU temperature results in a lower system temperature, which in turn increases system reliability.

In one embodiment, the thresholds are programmable, which allows the thresholds to be tailored for particular systems. For example, a particular system may have mission critical performance requirements and therefore would want to keep the high threshold relatively low and check utilization levels more frequently to ensure the performance requirements are met.

An important aspect of matching CPU performance to utilization is determining the utilization. As described with relation to FIG. 2, the power management control function periodically goes out and samples the utilization information. In a preferred embodiment, the power management control function is provided by power management software, which periodically extracts the utilization information by querying the operating system (OS).

Assume a computer system platform is running a multi-tasking operating system as is typical in current systems. Multiple tasks in different states of execution are therefore utilizing the processing resources. A typical multi-tasking operating system tracks the time each task spends executing. That information may be collected by other tasks, such as the power management software (or if the power management is a component of the operating system, to that component of the operating system). In one embodiment, the power management software queries the operating system periodically for an enumeration of the tasks that are running on the operating system. In addition, the power management software obtains execution statistics for each of the enumerated tasks, including those tasks that are part of the operating system, in order to determine how much CPU time the various tasks have used. The power management software then uses that information to create an overall utilization index for comparison to the high and low thresholds. In addition to the amount of CPU time used by a task, each task also has a priority, which may also be utilized by the power management software in determining the utilization index as described further herein.

Figure 4:
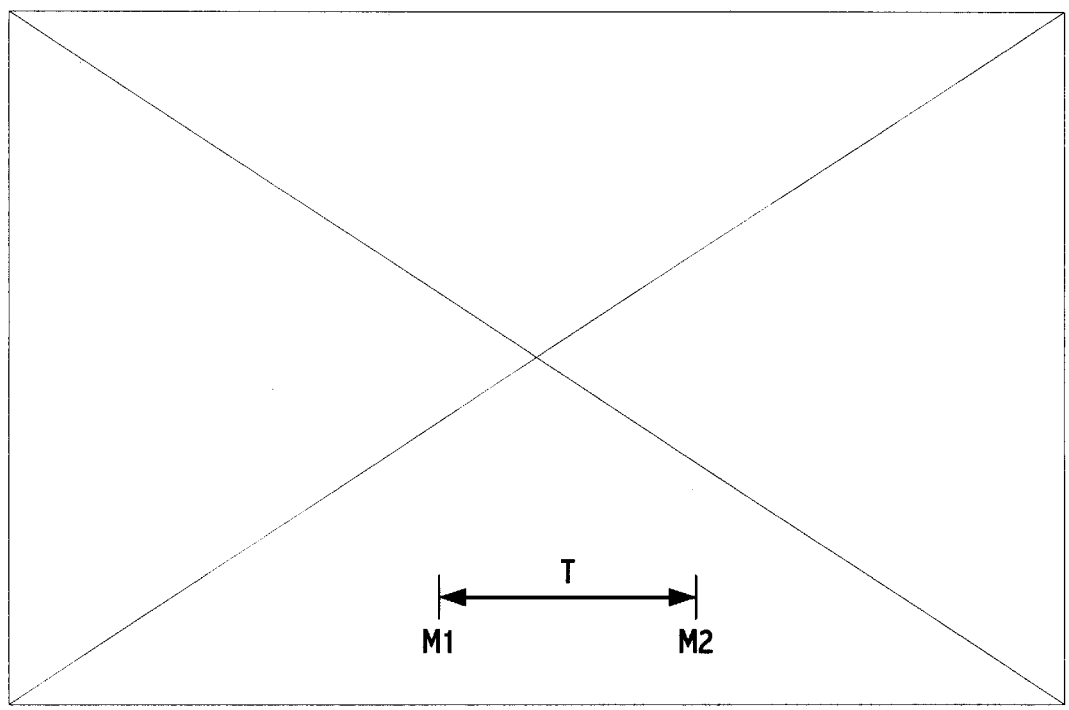
FIG. 4 illustrates exemplary statistics used to determine the utilization index.

Referring to FIG. 4, exemplary statistics that can be obtained for the utilization determination are illustrated. Assume the enumerated tasks, A, B, C, Power Management task, and idle task, are those shown in FIG. 4. The tasks may be operating system tasks or application tasks. In general, for each task, the operating system provides a cumulative total time for how much CPU time has used since the task started. As shown in FIG. 4, at measurement 1, the task A has used A1 time and at measurement 2, task A has used A2 time. The period of the measurement T is the time between the measurement M1 and M2. The amount of time utilized over the measurement period T, for task A is A2−A1. Similarly task B utilization time is B2−B1 and task C is C2−C1. Generally, the power management software is not interested in measuring its own utilization. In addition, the power management software may determine not to include tasks below a certain priority. Thus, certain IDLE tasks, which the operating system runs when the CPU is otherwise idle, are not counted in calculation of the utilization index. While the priorities shown in FIG. 4 are high, low, medium, and idle, in fact, priorities may be specified with greater granularity, e.g., with a value between 0–31. The power management software may select which priorities should be included, e.g., those tasks with priorities >3. The power management software sums the task utilization numbers for those tasks it determines are relevant for calculation of the utilization index and divides that number by the elapsed time T between successive measurements. The utilization index is thus determined as:

$$\frac{\sum TaskUtilizations}{T}$$

The power management software periodically obtains the CPU utilization information for the enumerated tasks. That utilization information obtained at one measurement time constitutes one utilization sample. In one preferred embodiment, multiple samples, e.g., 3, are used to calculate the utilization index, which is then compared to the high and low thresholds. Averaging utilization information allows the system to react more slowly to changes. That can have an advantage if utilization dips for one sample but then resumes for the next sample. Using averaged utilization values means the system will not reduce performance states in response brief changes in utilization. Fewer samples can be averaged when a more instantaneous response is desired to fluctuations in utilization. On the other hand, more samples can be averaged when the system should respond to fluctuations in utilization less quickly. In addition, the frequency of sampling can be increased or reduced with similar goals in mind. In addition, the operating system may influence the frequency of sampling according to how often the OS has statistics available. For example, in a Windows 98 environment, samples may be taken every 15 milliseconds while in an NT environment, samples may be taken, e.g., only every 100 milliseconds.

Note that the sampling frequency as well as the number of samples to average affect CPU utilization since the process of sampling and averaging consumes CPU cycles. In addition, as explained more fully herein, changing the performance state entails stopping processor operations and therefore also impacts system performance. Thus, some systems may want to lengthen the sample period and increase the number of samples averaged to reduce the cost that power management exacts in terms of CPU utilization or performance state change latency.

Note that the process of obtaining task information and the task of enumerating those tasks may be separate. In fact, the process of enumerating those tasks can consume so much time that that enumeration is not executed each time utilization statistics are obtained. In one embodiment, enumeration of tasks actually running occurs at approximately 1/8 the sample rate of utilization information. That can result in errors in that the samples may miss some tasks that have just begun, or may try to obtain statistics for tasks that have already ended. Since the tasks that are running change relatively infrequently, the time saved in enumerating tasks at a rate slower than obtaining samples can be beneficial in reducing CPU consumption by the power management software without introducing an inordinate amount of potential error.

Another aspect of determining the utilization information is that there are various tasks that may be excluded from the calculation of the CPU utilization index. For example, during a particular measurement period T, all higher priority tasks may be suspended for at least a portion of the period, thereby giving very low priority tasks an opportunity to execute. If the execution time spent by those very low priority tasks are included in the utilization index, there is a risk that the system performance state will be increased to account for the CPU execution time utilized by very low priority tasks. For example, inclusion of low priority tasks could cause the utilization ratio to rise to 82% and without those tasks the utilization would be 77%. Assuming a high threshold of 80%, the inclusion of the low priority tasks would result in a performance state increase because the utilization index is above the high threshold. Thus, the inclusion of low priority tasks may be generally undesirable. Of course, system requirements and objectives may vary and all tasks, or different tasks may be considered in determination of the utilization index in various systems.

In addition, other information may be utilized in combination with any or all of the above measurement statistics. One such piece of information is the mode in which the task is run. Typically, statistics can be obtained that provide not only cumulative execution time for a task but also how much of the task execution time was in user mode and how much was in kernel mode. For example, a task can run its code in user mode, make calls to operating system services and be interrupted by a hardware interrupt. In such a scenario, it may be desirable for the power management software to disregard the CPU time spent either in system mode, or interrupt mode, or both.

An environment where the approach of ignoring kernel time may be effectively utilized is as follows. Assume an embedded system that has a task that operates in user mode and depends on network data. If the task is awaiting a network packet and the task makes a call to the operating system to obtain the packet, the OS may sit waiting for a packet to arrive. The time period that is of particular interest in that situation is the user mode time utilized by the task. The OS mode time was spent waiting for a packet, an operation that does not require a performance increase.

Additional flexibility in calculating the utilization index can be provided by treating specific tasks differently. For example, those tasks belonging to a specific process or program or even those tasks belonging to the operating system itself, can be ignored or always accounted for differently from other tasks. Thus, the CPU time spent in all modes (user mode or kernel mode) or in one specific mode, may be disregarded for a specific task or group of tasks or the task(s) may be included or excluded from the determination of the utilization index regardless of task priority.

That capability of discriminating based on task may be useful in several situations. Some applications are badly written in terms of power management. For example, screen savers have been written that run at above idle priority. The ability to identify threads such as those and not incorporate them into the calculation of the utilization index would be beneficial.

Another special case may be presented when an application, typically a real time application, could fail because of the latency involved in performance state transitions. If such a task were identified, the power management software could stay in the current performance state until the task completed. In other scenarios, a task may always require a particular level of performance, e.g., the maximum, and when the power management software detects that task, it always changes to the maximum performance level regardless of the current utilization index.

Thus, the utilization information can be determined based on CPU utilization by the various tasks. The particular calculation of a CPU utilization index may utilize a programmable number of samples over a programmable sample interval. The calculation may choose to ignore certain tasks, such as those tasks that have low priority, and may treat user mode time differently than kernel mode time. Thus, the power management software can be adapted to a wide variety of applications. While most of the discussion has been for computer systems such as laptops or desktops, in fact, the power savings technique described herein can be applied to any electronic device in which power management as described herein can be effectively utilized.

In one embodiment, a user can select how the device operates. For example, a notebook user could selectably choose the notebook to operate at the maximum performance state, in automatic mode where the performance state is determined according to utilization, or in battery saver mode in which the lowest performance state is used.

The power control software in one embodiment is a driver running under the operating system. In a preferred embodiment, the software to implement the driver is actually in two parts. A part resides at an application level. That part queries the OS for information on CPU utilization by the various tasks running under the OS. Software at the application level also performs the sample averaging, compares the samples to the high and low threshold levels and determines if a performance change is required.

A second part of the power control software operates at a high privilege level (e.g. ring 0) and interacts directly with BIOS tables and hardware registers to determine actual run states in terms of VID/FID values (described further herein), how many performance states exist, and performs the actual write operations to the VID/FID register to initiate the change in the voltage/frequency settings for the processor. The application level software can query the privileged level software as to how many performance states exists for the processor and the current state. In order to change states, the application level software gives the privileged level driver abstracted performance requests in terms of a performance state (e.g. level 3), rather than actual FID/VID levels. Separating the driver into two drivers simplifies the development task and allows a large portion of the software (application level driver) to work on multiple platforms, thus reducing development time and cost.

Many platforms for which the power management techniques described would be useful also employ other common power management frameworks used today in personal computers, e.g. Advanced Configuration and Power Interface (ACPI) and the Advanced Power Management (APM) framework. These legacy power management frameworks are widely implemented and because of their wide use, they may be difficult to modify in order to incorporate the new power management techniques described herein. Therefore, it would be desirable to utilize the new power management capabilities in such a way that both the legacy power management schemes and the new power management capabilities can co-exist on the same computer without interfering with either the robustness or the effectiveness of the other.

Accordingly, in one embodiment, the power management software described herein does not involve any OS-BIOS communications. More specifically, the OS does not need to send APM commands to the BIOS for the purpose of the BIOS carrying them out. Such APM commands are used to cause changes in the power management state of the machine, request status, etc. Therefore, the BIOS has extensive, machine specific assembly language routines to support the commands. In contrast, a preferred embodiment of the power management software described herein utilizes a device driver and a policy daemon (i.e. "background task") to determine when and how to perform changes in the performance state of the machine. The changes in the performance state are done independently of the OS or of any operational code in the BIOS. While at any given performance state (frequency/voltage combination), APM and ACPI work as they normally do to throttle the CPU clock. The legacy power management frameworks have no knowledge that the CPU frequency has changed due to a performance state change. The legacy power management frameworks still handle idle periods (e.g. no activity for a prolonged period) by entering various sleep or suspend states and handle thermal overload situations in the same manner. Using this approach to the power management software allows platforms with the hardware to support performance state changes described herein to utilize both the power management software for performance state changes as well as the legacy power management schemes for more conventional power management approaches. In fact, under some scenarios, no BIOS change is even required and the performance state parameters may actually reside under the operating system, e.g., in the Windows registry or other appropriate persistent global data space.

In order to select performance states, a table is provided, e.g., in the BIOS, that specifies appropriate voltage/frequency pairs. The voltage/frequency combinations in that table are determined, typically during production, by running the CPU at a variety of voltages and frequencies and determining at which voltage/frequency pair the CPU operates properly. The result of that effort is commonly referred to as a "Shmoo Plot". There will be a different Shmoo Plot for each process technology that a CPU is implemented in, and additionally for each speed grade within that process technology. Each Shmoo Plot is converted into a performance state table that is stored in BIOS for use by the power management software. Since BIOS typically supports multiple processors, there is generally more than one performance state table in BIOS and the power management software has to determine the appropriate table for the processor in the platform. In one implementation the power management software looks at the CPUID, which includes the CPU model and silicon revision as well as other system related factors. However, the CPUID is not a hard indicator of which performance state table in BIOS to use since the CPUID may only identify the silicon design and not necessarily the process technology. Four items are examined to select the appropriate performance state table: (1) the front side bus (FSB) speed, (2) CPUID, (3) Start VID, and (4) Max FID. The FSB speed is important since frequency is typically expressed in multiples of the FSB speed. The last three variables are determined by CPU design, CPU fabrication process, and speed grade of that CPU in the given hardware design and fabrication process.

In another embodiment, a Shmoo class register can be implemented in hardware that informs the power management software which performance state table to use. Thus, the power management software can read that register to determine which performance state table to use. In a preferred embodiment, the register is implemented in fuse technology and is configured at the time the silicon speed grade is determined. The fuses can be electrically programmed or laser programmed to identify the appropriate silicon speed grade. That value can be used directly to indicate the performance state table to be used by the power management software. That does not mean that the CPU shmoo data will be used directly on the system since system-level factors can alter the actual voltage/frequency combinations that will run on a particular platform. Thus, the performance state tables are de-rated from the actual shmoo data obtained to account for system-level factors.

The power control software may want to provide access to other applications that want access to control the frequency and voltage of the platform. Other applications may not want to access those controls for complexity reasons, and more importantly, any action other applications take can be negated by the power management driver.

Accordingly, a standard interface is provided to allow other applications to utilize the power management software. In one embodiment, the other applications use a signaling method using Broadcast Windows Messages, which is a service built in the Windows operating system. The messaging technique may vary according to the operating system being used and within each operating system, multiple approaches can be used to allow an application to send a message to the power management software. For example registry keys may be utilized by the application. Other modes of communicating with a driver may be used according to the specific operating system and software design utilized.

In a preferred embodiment, the application desiring to control the power management software could cause the power management software to (1) pause the automatic control sequence, (2) pause the automatic control sequence and go to the lowest performance state (power level), and (3) continue the automatic control sequence. Pausing the automatic control sequence allows a task to initiate control of power management control registers (e.g., VID/FID register) directly without fear that the power management control software will interfere. The second mode may be used to recover from overheating. The third mode may be used to continue normal operations. Other modes can be readily envisioned as well, e.g., a mode causing the power management software to change to the maximum performance mode.

Figure 5:
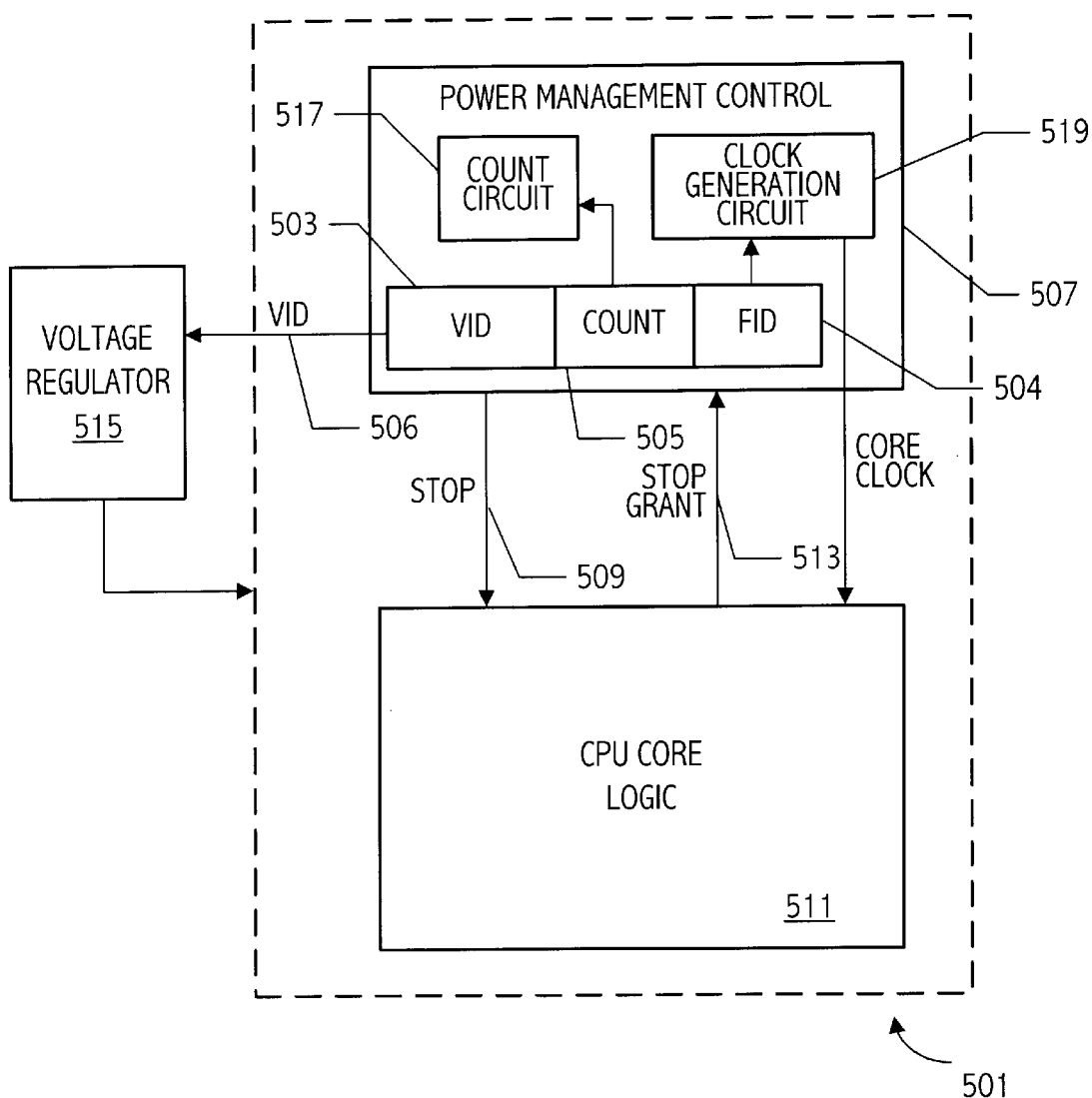
FIG. 5 show a processor that can adjust its operating voltage and frequency in accordance with processor utilization.

In order to effect changes to the performance state, the power management software has to cause the voltage and frequency used by the CPU to change. In one embodiment that can be accomplished as follows. Referring to FIG. 5, a processor is shown that can dynamically adjust its operating voltage and frequency to provide better thermal and power management in accordance with processor utilization. Processor 501 includes a programmable voltage ID (VID) field 503, core clock frequency control field (frequency ID (FID)) 504 and count field 505. Those fields may be located in one or more programmable registers. When the processor and/or system determines that a change to the operating voltage and/or frequency is desired to increase or decrease the performance state, the desired frequency and voltage control information are loaded into FID field 504 and VID field 503, respectively. Access to a register containing those fields, or an access to another register location, or access to a particular field in one of those registers can be used as a trigger to indicate that the processor should enter a stop grant state in which execution of operating system and application code is stopped. The access may result from, e.g., execution of a processor read or write instruction and in response to that access, power management control logic 507 supplies a stop signal 509 or other indication to indicate to CPU core logic 511 that the CPU core should stop execution of operating system and application code in order to enter a stop grant state.

Depending upon the process or implementation, stop signal 509 causes the processor to finish executing the current instruction, complete any current bus transactions and leave the host bus in an appropriate state or take any other necessary action prior to stopping code execution. Once the processor has completed all necessary preparations to enter the stop grant state, which vary depending on processor implementation, CPU core logic 511 supplies an asserted stop grant signal 513 or other indication to indicate to power management control logic 507 that CPU core logic 511 has entered the internally generated stop grant state. Note that while an internally generated stop grant state is described, other embodiments may utilize an externally generated stop grant state.

During the stop grant state, the processor can transition the voltage and frequency to the new states specified in VID field 503 and clock frequency control field 504. In some processor implementations, the processor core clocks are stopped after the processor enters the stop grant state. In other processor implementations, the processor core clock frequency is reduced to a frequency which can safely tolerate desired voltage changes.

In one implementation clock control frequency information is supplied as multiplier values for a clock that is supplied to processor 501. Those of skill in the art appreciate that many other approaches can be used to specify the core operating frequency.

In either case, the voltage control information specified in VID field 503 is supplied to voltage regulator 515 which in turn supplies CPU core logic 511 with the new voltage during the stop grant state.

Because changing the voltage and frequency can not be done instantaneously, the stop grant state needs to be maintained for a period of time to allow the new voltage and clock frequency to stabilize. In one embodiment, that time period is controlled through count circuit 517. Count circuit 517 begins counting once stop grant signal 513 is asserted, that is, once the stop grant state begins. The count circuit 517 is designed to count a sufficient amount of time for the voltage and frequency changes to stabilize. Additional details can be found in the application Ser. No. 09/617,382 entitled "Method and Apparatus for entering an Internally Generated Stop Grant State for a Predetermined Period", by Frank P. Helms, filed Jul. 17, 2000. In one embodiment, as illustrated in FIG. 5, that time period is programmable through count register 505, which specifies the duration of the stop grant state. Once count circuit 517 has counted to the desired count value, the power management control logic 507 causes stop signal 509 to be deasserted, which indicates to CPU core logic 511 that it should exit the stop grant state. On exiting the stop grant state, CPU core logic 517 resumes executing operating system and application code.

In some processor implementations, CPU core logic 517 may resume executing code at the new clock frequency immediately on exiting the stop grant state. In other implementations, for example, when CPU core logic executes at a reduced clock speed during the stop grant state, clock generation logic 511 may increase the core clock speed in increments up to the newly specified operating frequency after exiting the stop grant state and the CPU core may resume execution of OS and application code after the core clock speed is at the specified operating frequency. In one embodiment, it takes on the order of 100–200 microseconds to change to a new performance state.

Figure 6:
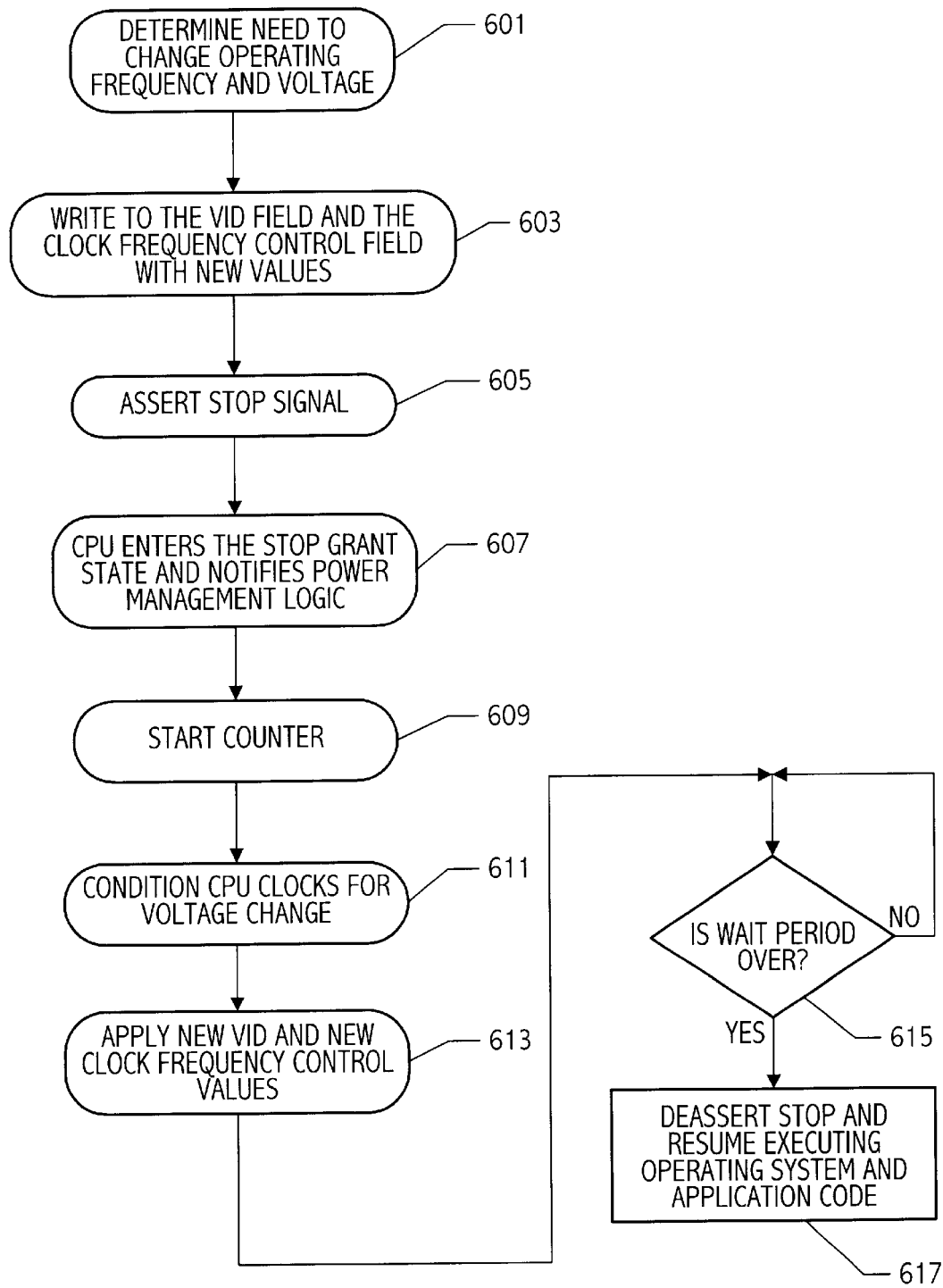
FIG. 6 shows the high level operation of switching performance states for the processor shown in FIG. 5.

Referring to FIG. 6, the high level operation of processor 501 in accordance with one embodiment of the invention is described. In 601, the processor (or system) determines there is a need to change operating frequency and voltage to enter a new performance state. The processor then writes desired voltage and frequency values to VID field 203 and FID field 204. The fields may be located in one or more model specific registers. In addition to writing fields 203 and 204, if necessary, the processor can write to count field 205 to specify the duration of the stop grant state. An access to a register containing those fields (or a read or write access to another register or an instruction) may be used as an indication to begin the process of entering the stop grant state.

In one preferred embodiment, the VID/FID fields are located in a single register. Note that software in general prefers to do as few register I/O accesses, in order to get the desired result. In addition software would prefer to build the contents of a control register using the register itself as opposed to building the various control fields in memory and then transferring the fields to the control register. In a typical register, any I/O write to the register causes a change in the control state of the machine. That is, a write to the VID/FID register would initiate the stop grant state sequence. Thus, one could not build the register bit-field by bit-field since each write to a bit-field would result in a change to the machine control state. It is potentially advantageous to modular software to have a register that does not begin a control sequence each time any one of its fields is accessed. If a different function is used to build each bit field, then a register whose access to any field causes a control state change would require a shared memory buffer between all function so that each piece of modular software could build its portion,of a bit field for the register in question. The shared memory buffer would be an additional overhead for each function.

In one embodiment, given a register that has several bit fields defined, one of the bit field serves a dual purpose of both holding some useful control information and serving as the trigger to actually change the state of the underlying hardware. All other bit fields in the register can be read and written without causing the hardware to change state. That is, the FID/VID control register only causes a stop grant state when one of the FID or VID fields is written or otherwise accessed. A write to the other bit field does not initiate a performance state change.

Referring again to FIG. 6, once that indication is received, and the CPU core logic receives a request to enter the stop grant state in 605, the CPU takes all necessary actions to place the CPU in the stop grant state (e.g., completing instructions and/or bus cycles) and then asserts stop grant signal 513 to power management control logic 507 in 607 to indicate that the CPU has entered the stop grant state.

The asserted stop grant signal from CPU core 513 causes the count circuit 517 to begin counting in 609. The count circuit 517 determines the duration of the stop grant state.

Note that writing to the count field 505 may be omitted under certain circumstances. For example, the count circuit may be hard coded to wait a sufficient time for the new voltage and frequency values to stabilize. Alternatively, the count field may maintain its previous value and thus only has to be written once. In any case, once in the stop grant state, CPU clocks are stopped or reduced by clock generation circuit 519 to condition the CPU clocks in 611 to permit the desired voltage changes.

During the stop grant state, the new VID values are applied to voltage regulator 515 and the new clock frequency control values are supplied to clock generation circuit 519 in 613. Clock generation circuit 519 typically includes a phase locked loop (PLL) and the circuit takes some time to lock in to the new frequency. Even if the PLL is generating a stable new clock at the desired frequency, the CPU core is still getting either no clock or a divided down clock as the voltage stabilizes. After the count has expired, i.e., the waiting period in 615 is determined to be over, power management control logic 507 deasserts its stop signal and the CPU core logic 511 resumes executing code in 617. Note that the latency involved in switching to a new performance state can be on the order of 200 microseconds.

Note that changing both voltage and frequency to enter a new performance state can be particularly effective. Changes in the processor's core clock frequency have an approximately linear affect on the power dissipated by the processor. Thus, a 20% reduction in clock frequency reduces the power dissipated by the processor by 20%. The range of change is significant since a ratio of lowest frequency to highest frequency is usually greater than 2:1. Consequently, the processor's power may be changed by similar ratio. Changes in the processor's core voltage have an approximately square law effect. That is potential power savings is proportional to the square of the percentage of voltage reduction. Although the range of change of voltage is generally less than 50%, the square law effect results in significant changes in the processor's power if the core voltage of the processor is reduced.

There is a risk that under certain conditions, the power management software can get out of sync with the actual state of the machine. Certain operating systems, such as the Windows operating system, signal applications about changes in the power state of the platform, e.g., information as to whether the platform is operating on line voltage or battery power. However, those messages are not always received in the right order, received correctly, or in a timely manner. That can be especially problematic when the platform transitions to a sleep or suspend state and subsequently experiences power state changes, when, e.g., the platform is unplugged from AC line power. In addition, other applications may access the power management control registers (e.g., VID/FID registers) causing the platform to enter a higher or lower performance state without informing the power management software.

Figure 7:
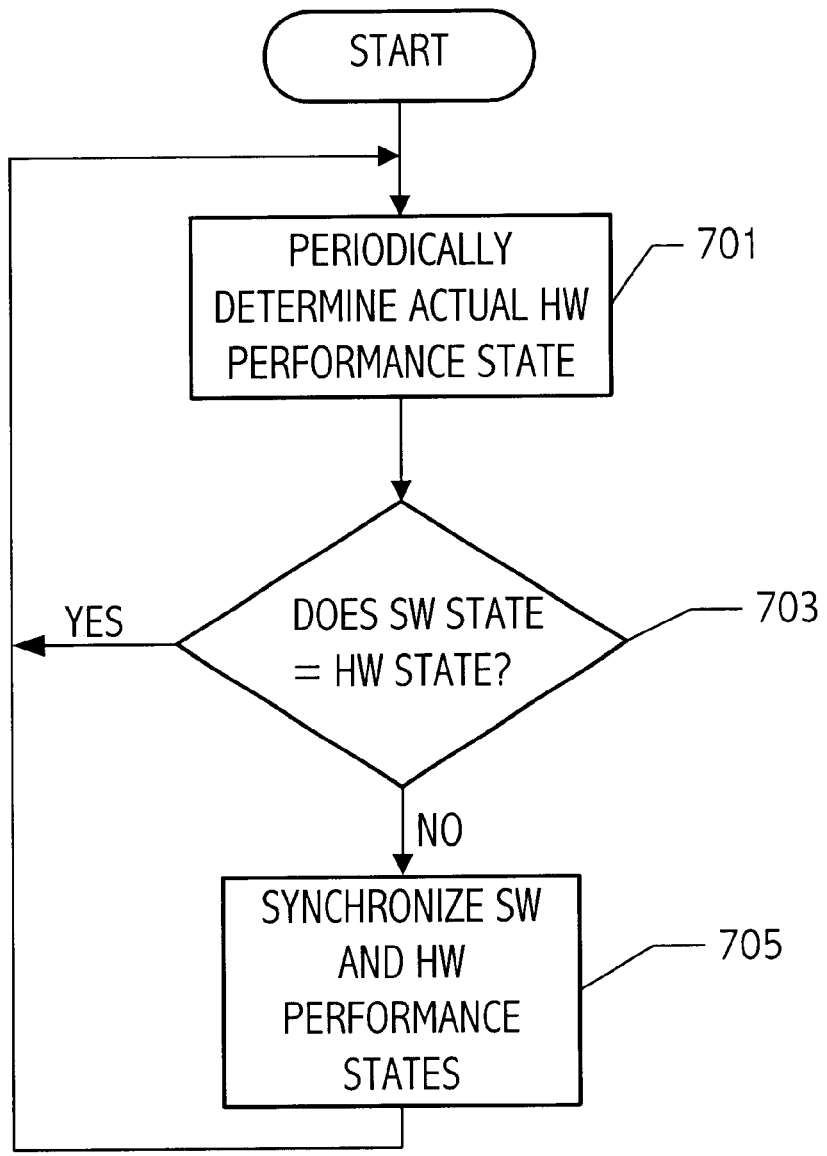
FIG. 7 illustrates a high level flow diagram of a resynchronization task operable to ensure the power management software does not remain out of sync with the actual hardware performance state.

Therefore, in order to avoid the possibility of the power management software becoming out of sync with the actual performance state of the platform, the power management software in one embodiment is self-correcting. In that embodiment, a separate resynchronization task operates in accordance with FIG. 7 to periodically (e.g., every two seconds) determines the current actual performance state of the hardware in 701, which can be determined from the VID/FID register, as well as the current power state in which the power management software thinks the platform is operating. The resynchronization task does a comparison in 703 and if the comparison indicates a mismatch between the performance state the power management software thinks the platform is operating at and the actual performance state of the platform, corrective action is taken in 705 to resynchronize the hardware and software performance states. The corrective action may be to reinitialize the power management software. Such a reinitialization can e.g., set the power management software into the state it enters on reset in which it assumes the hardware state is unknown. During such a reinitialization, the hardware power state may be set to the maximum performance level and internal software operating parameters reinitialized to a known state. In that way, any errors that may be present in software variables on detection of the mismatch can be eliminated.

Alternatively, if the power management software detects a discrepancy between the hardware and software state, the software state may be set to match the hardware state. For example, assume a processor has five performance levels. If the actual performance state of the hardware is at level 2, and the software thinks the hardware is at level 4, the resynchronization is achieved by setting the software to level 2. The power management software can then continue its function having been resynchronized to the actual performance state of the platform. In still another embodiment, the hardware state is changed to match the software state if a discrepancy is detected. In such an embodiment, the hardware performance state is set to level 2 to match the software performance state.

Thus, with any of the resynchronization embodiments described above, if the power management software every gets out of sync with the actual state of the machine, that lack of synchronization will be short lived. In addition, because the power management software is a background power control task, the resynchronization event is unnoticed by the user. Note that while the resynchronization task has been described above in terms of various software embodiments, the resynchronization task can also be accomplished substantially in hardware, by using, e.g, compare logic to detect a difference between a storage location storing the software state and the VID/FID register. An asserted compare signal can be used to initiate either a hardware implemented or software implemented resynchronization (or a combination of the two).

Note that the description of the invention set forth herein is illustrative, and is not intended to limit the scope of the invention as set forth in the following claims. For instance, while this invention has been described with relation to a computer systems such as desktops and a class of mobile computers referred to herein as notebooks (which may also be referred to as laptops or portable computers), the teachings herein may also be utilized in other computing devices, such as servers and/or portable computing devices such as personal digital assistants, (PDAs) which are handheld devices that typically combine computing, telephone/fax, and networking features or in other small form factor computing and/or communication equipment, where such power management techniques described herein may prove useful. In addition, the power management techniques may be applied to other components of the systems described herein besides the processor. Other variations and modifications of the embodiments disclosed herein, may be made based on the description set forth herein, without departing from the scope and spirit of the invention as set forth in the following claims.

What is claimed is:

1. A method of managing power in a computing system comprising:
   periodically determining a current hardware power state of an integrated circuit;
   periodically comparing the current hardware power state to a software power state maintained by power management software, the software state representing an assumed power state of the integrated circuit; and
   resynchronizing at least one of the hardware power state and the software power state if a discrepancy exists between the hardware power state and the software power state.

2. The method as recited in claim 1 wherein the resynchronizing includes reinitializing the power management software maintaining the software power state.

3. The method as recited in claim 1 wherein the resynchronizing includes changing the software power state to match the hardware power state.

4. The method as recited in claim 1 wherein the resynchronizing includes changing the hardware power state to match the software power state.

5. The method as recited in claim 1 wherein the hardware power state is a performance state corresponding to an operating voltage and clock frequency of the integrated circuit.

6. The method as recited in claim 1 wherein the software power state indicates one of a plurality of possible performance states, each performance state being a unique combination of operating voltage and frequency of the integrated circuit.

7. A computer system comprising:
   an integrated circuit;
   a first instruction sequence operable on the integrated circuit to periodically determine a current hardware power state of the integrated circuit;
   a second instruction sequence operable on the integrated circuit to periodically compare the current hardware power state to a software maintained power state, the software maintained power state indicating a power state assumed by power management software, the second instruction sequence operable to generate an indication of the comparison; and
   a third instruction sequence operable on the integrated circuit to resynchronize at least one of the hardware power state and the software maintained power state if a discrepancy exists between the hardware power state and the software maintained power state.

8. The computer system as recited in claim 7 wherein integrated circuit includes a processor.

9. The computer system as recited in claim 7 wherein the resynchronizing includes reinitializing the power management software maintaining the software maintained power state.

10. The computer system as recited in claim 7 wherein the software maintained power state indicates one of a plurality of possible performance states, each performance state being a unique combination of operating voltage and frequency.

11. A computer program product encoded in at least one computer readable medium to implement power management, the computer program product operable to:
   periodically determine an actual performance state of an integrated circuit;
   periodically compare the actual performance state to a software maintained performance state and generate an indication of the comparison; and
   resynchronize the actual performance state and the software maintained performance state if the indication indicates that a discrepancy exists between the actual performance state and the software maintained performance state.

12. The computer program product as recited in claim 11 wherein the actual performance state and the software maintained performance state are resynchronized by reinitializing power management software maintaining the software maintained performance state.

13. The computer program product as recited in claim 11 wherein the actual performance state and the software maintained performance state are resynchronized by changing the software maintained performance state to match the actual performance state.

14. The computer program product as recited in claim 11 wherein the actual performance state and the software maintained performance state are resynchronized by changing the actual performance state to match the software maintained performance state.

15. The computer program product as recited in claim 11 wherein the at least one computer readable medium is selected from the set of a disk, tape or other magnetic, optical, or electronic storage medium and a network, wireline, wireless or other communications medium.

16. A computing system comprising:

an integrated circuit having multiple operational performance states;

means for periodically determining an actual performance state of the integrated circuit;

means for periodically comparing the actual performance state to a power management software performance state representing an assumed performance state and for generating an indication of the comparison; and means for resynchronizing the actual performance state and the power management software performance state if the indication indicates that a discrepancy exists between the actual performance state and the power management software performance state.

17. The computing system as recited in claim 16 wherein the actual performance state and the power management software performance state are resynchronized by changing the power management software performance state to match the actual performance state.

18. The computing system as recited in claim 16 wherein the actual performance state and the power management software performance state are resynchronized by changing the actual performance state to match the power management software performance state.

19. The computing system as recited in claim 16 wherein the actual performance state and the power management software performance state are resynchronized by reinitializing the power management software maintaining the power management software performance state and thereby changing the actual performance state to a maximum performance state.

* * * * *